United States Patent [19]
Buchanan

[11] Patent Number: 6,009,408
[45] Date of Patent: Dec. 28, 1999

[54] AUTOMATED PROCESSING OF TRAVEL RELATED EXPENSES

[75] Inventor: Carla C. Buchanan, Mission, Kans.

[73] Assignee: Electronic Data Systems Corporation, Plano, Tex.

[21] Appl. No.: 08/625,971

[22] Filed: Apr. 1, 1996

[51] Int. Cl.$^6$ .................................................. G06F 17/60
[52] U.S. Cl. .................................................. 705/11; 705/5
[58] Field of Search .................................. 705/1, 5, 6, 7, 705/11; 235/375, 376, 379, 380

[56] References Cited

U.S. PATENT DOCUMENTS

| | | | |
|---|---|---|---|
| 4,837,422 | 6/1989 | Dethloff et al. | 235/380 |
| 4,862,357 | 8/1989 | Ahlstrom et al. | 705/6 |
| 5,021,953 | 6/1991 | Webber et al. | 705/6 |
| 5,237,499 | 8/1993 | Garback | 705/5 |
| 5,621,201 | 4/1997 | Langhans et al. | 235/380 |
| 5,666,530 | 9/1997 | Clark et al. | 707/201 |
| 5,740,427 | 4/1998 | Stoller | 395/615 |

OTHER PUBLICATIONS

Wada; "T & E Tracking: Keeping it Simple"; Travel Weekly; v49 n77; p11(1), Sep. 1990.

Shellenberger; "A New Concept in T&E Management"; Compensation and Benefits Review; v23 n6; p13(5), Nov. 1991.

Rosen; "Amex's Help on Expense Reports Draws Conrail"; Business Travel News; ISSN: 8750–3670; p. 12, Feb. 1993.

Carroll; "Cos. Eying T&E Reporting Alternatives, Experts Say"; Travel Weekly; v54 n82; p57(2), Oct. 1995.

*Primary Examiner*—Stephen R. Tkacs
*Attorney, Agent, or Firm*—L. Joy Griebenow; Baker & Botts L.L.P.

[57] ABSTRACT

A system (10) for facilitating the processing of travel related expenses includes a database (40) which stores a traveler profile (50), a customer profile (52), and a traveler category rule set (56). A controller (36), connected to the database (40), receives travel itinerary information for a traveler associated with a customer (12). The controller (40) determines a specified amount of funds to be allocated to the traveler and transfers the specified amount of funds from an account of the customer (12). In addition, the controller (40) provides at least a portion of the transferred funds to the traveler, for example, through an automatic teller machine network (20). The controller (40) receives a record, for example, via an electronic data interchange interface (24), of any transactions in which the traveler spends the portion of transferred funds, thereby facilitating the processing of travel related expenses.

17 Claims, 3 Drawing Sheets

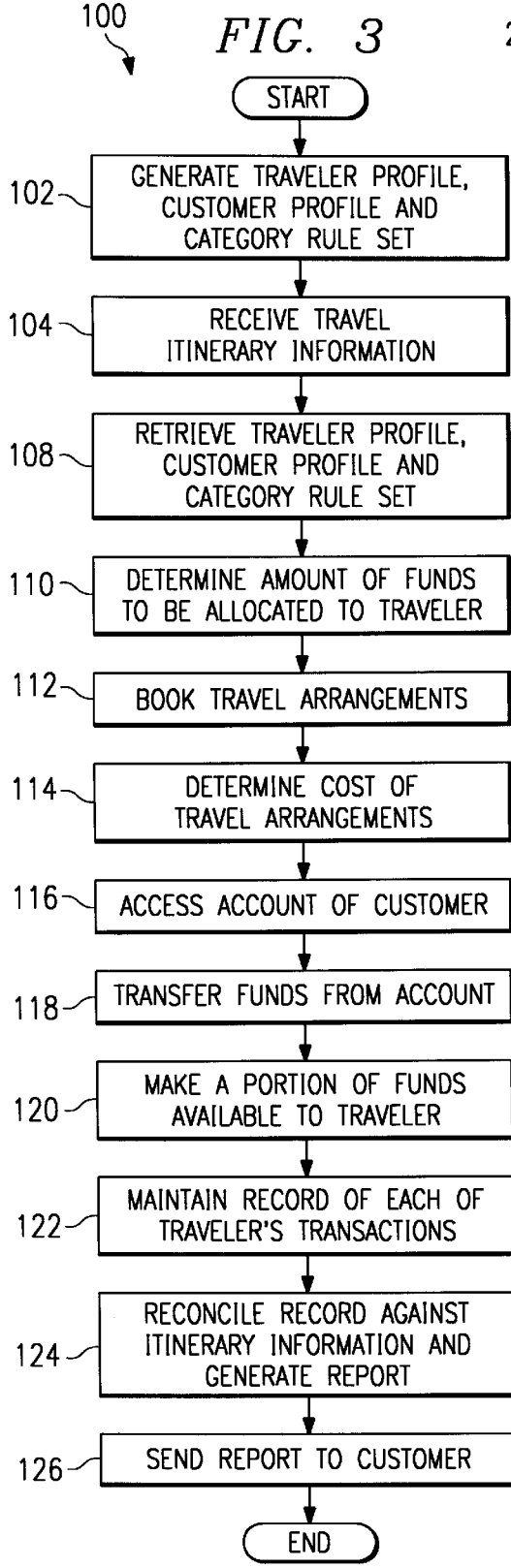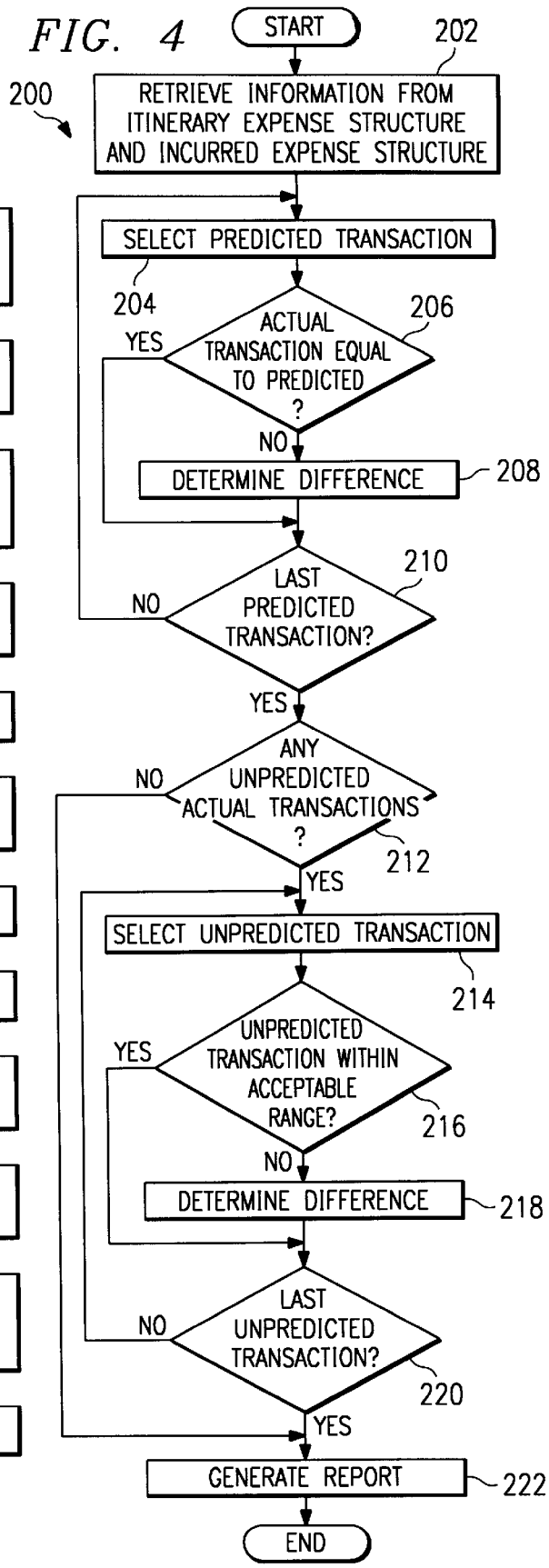

AUTOMATED PROCESSING OF TRAVEL RELATED EXPENSES

TECHNICAL FIELD OF THE INVENTION

This invention relates generally to the field of data processing, and more particularly, to the automated processing of travel related expenses.

BACKGROUND OF THE INVENTION

Many people who travel do not ultimately pay for their travel related expenses. For example, the expenses of a person traveling for work-related matters are often paid by the person's employer. Likewise, the expenses of a lecturer who travels from one city to another are often paid by a sponsoring organization or group in each city. Ordinarily, in order for these travelers to be reimbursed for all of their expenses, they are required to obtain and keep paper receipts, which must be submitted to the ultimate payer. In many cases, if a traveler lost or, alternately, did not obtain a paper receipt for a particular expense, the payer would not reimburse for the expense.

Furthermore, in addition to submitting the receipts, a traveler was often required to fill out a detailed expense report. Before reimbursing the traveler, the ultimate payer would review the receipts and detailed expense report to ensure that all expenses were legitimate and/or fell within appropriate guidelines, such as, a maximum dollar amount for dinner. After reimbursing the traveler, the ultimate payer was then required to maintain a record of the receipts for tax purposes. Consequently, the prior method of processing travel-related expenses was extremely burdensome, time-consuming, and inefficient.

SUMMARY OF THE INVENTION

In accordance with the present invention, the disadvantages and problems associated with processing travel-related expenses have been substantially reduced or eliminated.

In accordance with one embodiment of the present invention, a method for facilitating the processing of travel related expenses is provided. The method includes generating a traveler profile, a customer profile, and a category rule set. Travel itinerary information can be received for a traveler associated with a customer. Information is retrieved from the traveler profile, the customer profile, and the category rule set. Next, a specified amount of funds to be allocated to the traveler is determined and the funds are transferred from an account of the customer. At least a portion of the transferred funds are provided to the traveler. A record of any transactions in which the traveler spends the portion of transferred funds is received, thereby facilitating the processing of travel related expenses.

In accordance with another embodiment of the present invention, a method for facilitating the processing of travel related expenses includes the following steps: receiving travel itinerary information for a traveler associated with a customer; booking travel arrangements for the traveler according to the received travel itinerary information, the travel arrangements having a specified cost; and transferring funds from an account of the customer according to the specified cost of the travel arrangements, thereby facilitating the processing of travel related expenses.

In accordance with yet another embodiment of the present invention, a system for facilitating the processing of travel related expenses includes a database which stores traveler profile information, customer profile information, and traveler category rule set information. A controller, connected to the database, receives travel itinerary information for a traveler associated with a customer. The controller determines a specified amount of funds to be allocated to the traveler and transfers the specified amount of funds from an account of the customer. In addition, the controller provides at least a portion of the transferred funds to the traveler and receives a record of any transactions in which the traveler spends the portion of transferred funds, thereby facilitating the processing of travel related expenses.

A technical advantage of the present invention includes providing a travel information processing system that receives receipts for services and/or products directly from the providers. More specifically, the providers of services or products may send electronic images of the receipts to the travel information processing system via an electronic data interchange (EDI) interface. Consequently, the need for a traveler to obtain and keep track of paper receipts is substantially reduced or eliminated.

Another technical advantage of the present invention includes an automated process of reporting the actual travel-related expenses of a traveler. This is accomplished by determining one or more predicted expenses for traveler before travel has begun, receiving receipt information for the actual expenses as they are incurred, and reporting the actual expenses against the predicted expenses. Thus, an ultimate payer for the expenses of the traveler is not required to review the expense receipts by hand.

Yet another technical advantage of the present invention includes automatically regulating the availability of funds allocated to a traveler according to the traveler's category or class. For example, travelers in one category may receive funds corresponding to a per diem allowance only on the specified date for the allowance, whereas travelers in a second category may receive funds corresponding to the per diem allowances for several days in a lump sum prior to travel.

Yet another technical advantage of the present invention is that funds from a financial account maintained by an ultimate payer of travel expenses can be transferred using an electronic funds transfer (EFT) account number. The transferred funds can be set aside for use by a traveler associated with the payer.

Yet another technical advantage of the present invention is providing a system that directly credits funds in payment of travel services or products to financial accounts maintained by the providers of such services or products. Consequently, the providers are not required to pay service charges to a credit card company as would be the case if a credit card was used to pay for the products or services.

BRIEF DESCRIPTION OF THE DRAWINGS

For a more complete understanding of the present invention and for further features and advantages, reference is now made to the following description taken in conjunction with the accompanying drawings, in which:

FIG. 3 illustrates a flow chart of a method for processing travel-related expenses; and FIG. 4 illustrates a flow chart of a method for reporting actual travel expenses against predicted travel expenses.

DETAILED DESCRIPTION OF THE INVENTION

Figure 1:
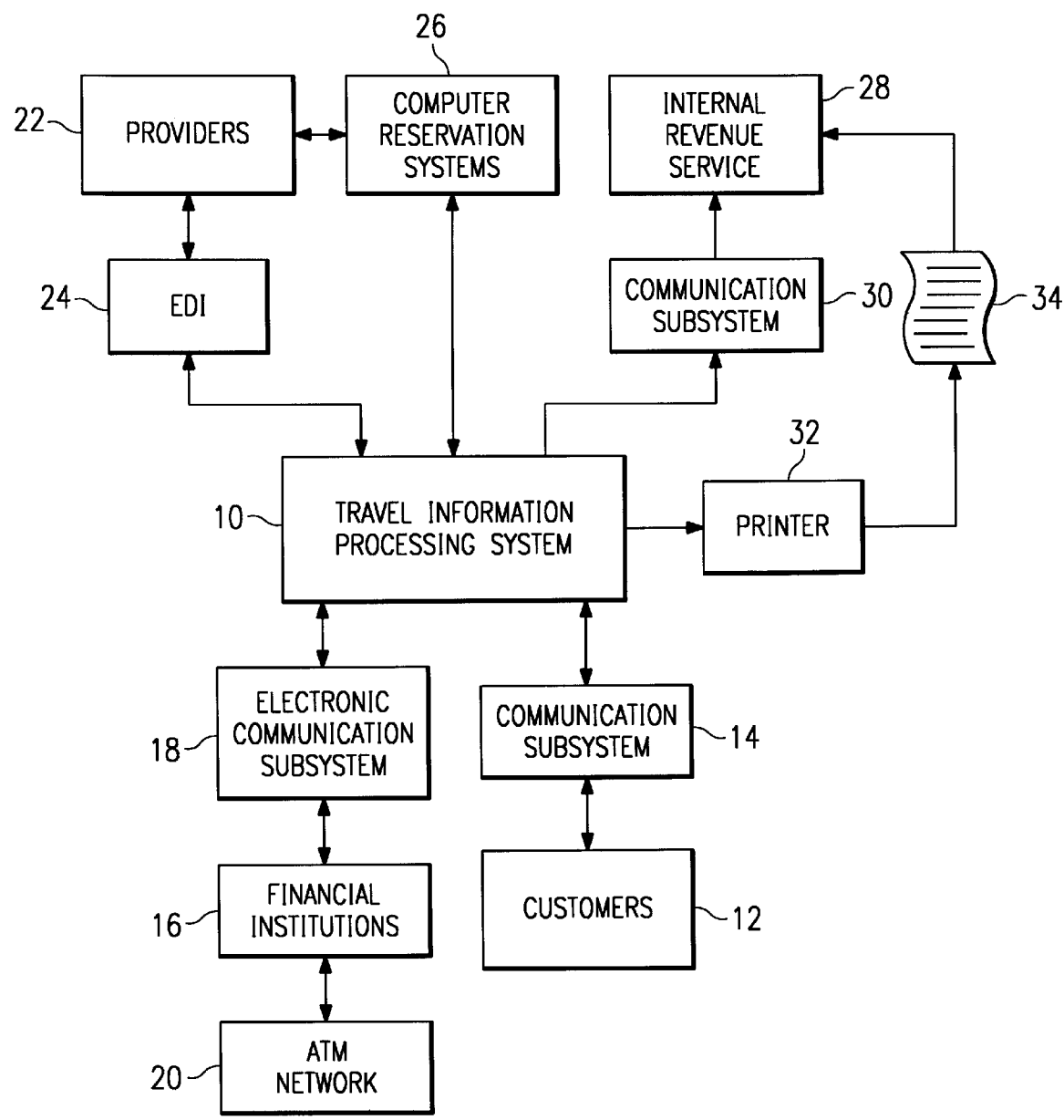
FIG. 1 illustrates a schematic diagram of one embodiment of an automated travel information processing system of the present invention.

FIG. 1 illustrates a diagram of one embodiment of a travel information processing system 10. Travel information processing system 10 may be used to automatically process travel-related expenses. In one embodiment, travel information processing system 10 can be maintained and operated by an entity in the business of processing information or data for others. Alternatively, the system can be maintained and operated by any one or more entities which ultimately pay for the travel-related expenses of a traveler.

Referring to FIG. 1, if travel information processing system 10 is maintained and operated by an information processing entity, one or more customers 12 of the information processing entity can communicate with system 10 via one or more communications subsystems 14. Each customer 12 can be an individual, a business organization (e.g., corporation, company, firm, etc.), a non-profit organization (e.g., a charitable organization), an educational institution (e.g., high school or university), or any other entity which may ultimately pay the travel-related expenses of a traveler. Consequently, each customer 12 may be associated with one or more travelers. Customers 12 receive services from travel information processing system 10 in the form of processing travel-related information for the customers. Each customer 12 may communicate with travel information processing system 10 to send and receive travel itinerary information and travel related expense information for its associated travelers over a communications subsystem 14. Communications subsystem 14 may function to provide two-way communications between a customer and travel information processing system 10. For example, communications subsystem 14 may be a telephone system, a facsimile machine, or a computing system providing electronic-mail communications or remote processing capability. Communications subsystem 14 can include an electronic data interchange (EDI) interface for sending and receiving information electronically.

One or more financial institutions 16 may be linked to travel information processing system 10 by an electronic communications subsystem 18. Each financial institution 16 may be any entity which maintains monetary accounts, such as a bank, a credit union, a savings and loan institution, or the like. Electronic communications subsystem 18 may function to provide secure communication so that travel information processing system 10 can access the monetary accounts within each financial institution 16 to debit and credit appropriate accounts. For example, electronic communications subsystem 18 may be a computer-driven data processing system or any other suitable electronic media that allows access using an electronic funds transfer (EFT) account number. Electronic communications subsystem 18 may include an EDI interface. Furthermore, each financial institution 16 can be connected to a network 20 of automatic teller machines (ATMs) which allow travelers to withdraw cash for travel expenses.

One or more providers 22 can be electronically linked to travel information processing system 10 by suitable media, including an EDI interface 24. Generally, each provider 22 is an individual or organization which may provide a product or service to a person when traveling. Consequently, a provider 22 can be any entity or organization providing travel or business arrangements or services, such as an airline, a hotel, an automobile rental agency, or the like. In addition, a provider 22 may be any entity or organization, such as a travel agency, which coordinates the reservation, booking, and payment of travel arrangements. Also, a provider 22 can be an entity, such as a restaurant or a copy shop, which provides a product or service that is not specifically related to travel but may be utilized during a particular trip. Like customers 12, providers 22 can receive services from travel information processing system 10. For example, a provider 22 may choose to have funds in payment of services or products directly credited its financial account, thereby eliminating any service charges that would be required as would be the case if a credit card was used to pay for the services or products. EDI interface 24 functions to provide two-way communications between travel information processing system 10 and providers 22 so that system 10 can send and receive electronic information for processing travel expenses and booking travel arrangements.

One or more computer reservation systems 26 can be linked electronically with travel information processing system 10 and providers 22. Each computer reservation system 26 may be one or more commercially available computer reservation systems, such as, but not limited to, the SABRE® system owned by American Airlines, the WorldSpan® system owned by Pars Marketing Partnership, the Apollo® system owned by Galileo International Partnership, or the System One® system owned by Amadeus Global Travel Distribution. Computer reservation systems 26 provide travel service inventory information such as airline flight, hotel, and rental vehicle availability and rates. Computer reservation systems 26 can be used by travel information processing system 10 to make reservations for and book the travel arrangements provided by certain providers 22.

Computer systems associated with the Internal Revenue Service (IRS) 28 can be linked with travel information processing system 10 by a suitable communications subsystem 30. IRS system 28 collects information supporting tax returns from customers 12. Because the taxable income of a particular customer 12 may often be reduced by the amount of travel related expenses incurred by travelers associated with the customer, customers 12 may request that receipt information kept in travel information processing system 10 be sent to IRS system 28. Communications subsystem 30 may function to provide two-way communications between IRS system 28 and travel information processing system 10. For example, communications subsystem 30 may be a telephone system, a facsimile machine, or a computing system providing electronic-mail communications or remote processing capability. In addition, communications subsystem 30 may include an EDI interface or other media that allows electronic images of receipts to be sent to IRS system 28.

Printer 32 is linked electronically with travel information processing system 10. Printer 32 uses information received from system 10 to generate paper receipts 34 that are submitted to IRS system 28 for tax purposes, if necessary.

Generally, according to one embodiment, travel information processing system 10 functions to receive itinerary information from customers 12. The itinerary information relates to travel by at least one traveler whose expenses are ultimately paid by a particular customer 12. In response to the received itinerary information, travel information processing system 10 may function to book travel arrangements for the traveler with one or more providers 22 and also predict the amount of expenses that will be incurred by the traveler. Travel information processing system 10 may also function to access an appropriate financial institution 16 to debit an account of the customer 12 according to the cost of the booked travel arrangements and the predicted expenses.

As the expenses are actually incurred by the traveler, travel information processing system 10 may receive expense information from other providers 22. Travel information processing system 10 may also function to report the actual expenses against the predicted expenses. The actual expense information can be maintained in a suitable storage medium and forwarded to Internal Revenue Service 28 for tax purposes if desired. According to another embodiment, travel information processing system 10 may serve only as an information warehouse to send, receive, and store information for customers 12, providers 22, and the IRS as requested or required by the parties. The entity operating the travel information processing system can charge both customers 12 and providers 22 for the informational services provided. The operation of travel information processing system 10 is described below in more detail.

Figure 2:
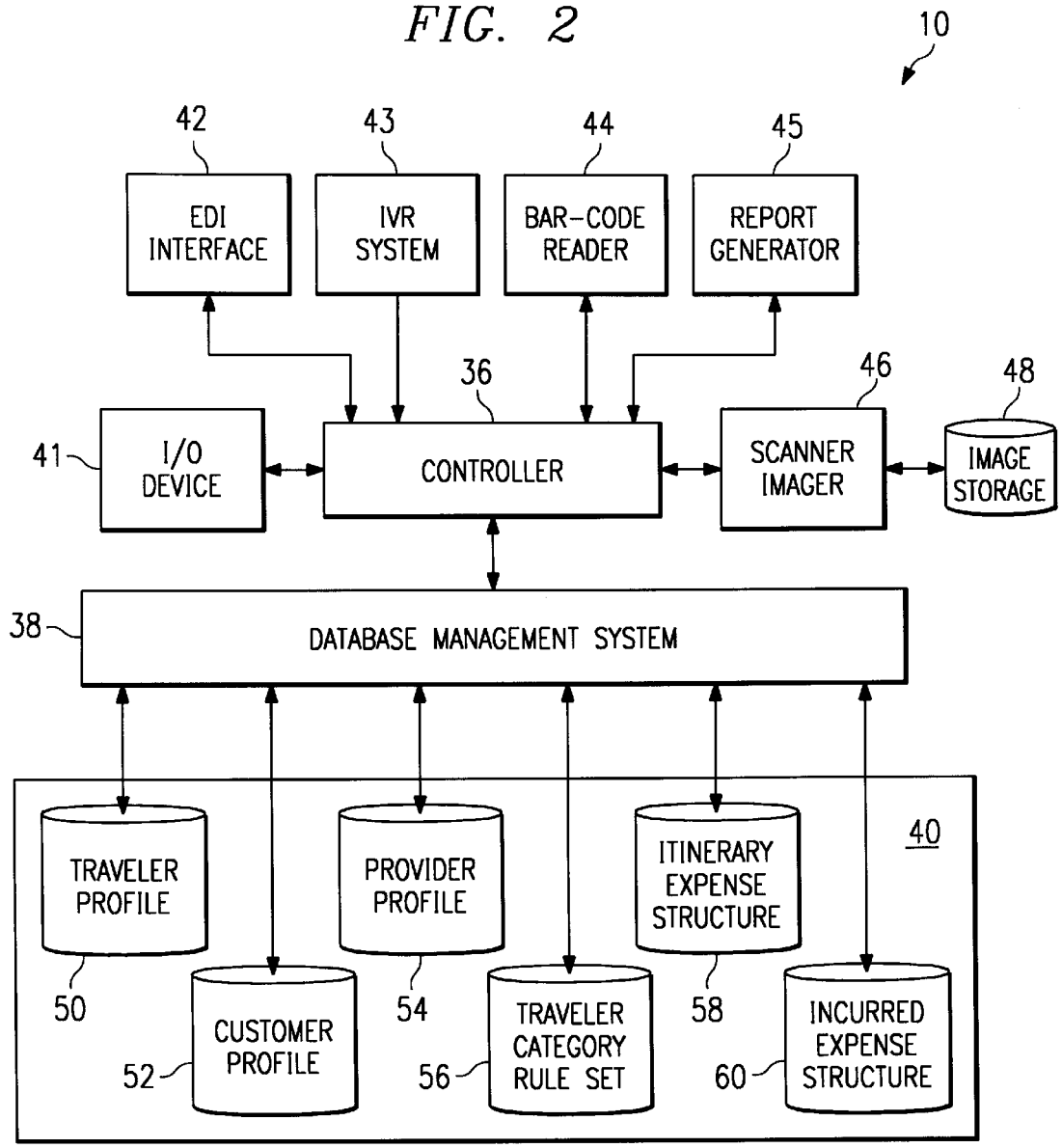
FIG. 2 illustrates the components of the travel information processing system shown in FIG. 1.

FIG. 2 illustrates the components of one embodiment of a travel information processing system 10. More specifically, travel information processing system 10 includes a controller 36, a database management system 38, a database 40, an input/output (I/O) device 41, an electronic data interchange (EDI) interface 42, an interactive voice response (IVR) system 43, a bar-code reader 44, a report generator 45, a scanner imager 46, and an image storage device 48.

Controller 36 can be implemented as a process server, a local file server, a mainframe computer, a work station, a desktop computer, and any other device or combination of systems operable to process information. Controller 36 functions to process command information and travel related data, such as information relating to travel arrangements and travel related expenses.

Database management system 38 is electronically linked to controller 36. Database management system 38 functions to route and retrieve information to and from a plurality of profiles or data structures in database 40. Database management system 38 may be implemented from any of a variety of hardware and software components suitable for organizing or structuring the information contained in database 40. Consequently, database management system 38 may maintain a system of pointers or indexes that relate information stored in the various profiles and data structures.

Database 40 is linked to database management system 38. Database 40 can be a relational database which resides in a suitable data storage medium, such as RAM, ROM, disk or tape storage. Database 40 contains a plurality of profiles and data structures which may comprise a traveler profile 50, a customer profile 52, a provider profile 54, a traveler category rule set 56, an itinerary expense data structure 58, and an incurred expense data structure 60. These profiles and data structures contain information that can be used by travel information processing system 10 to process travel related expenses for customers 12.

A separate traveler profile 50 may be maintained in database 40 for each traveler whose expenses are processed by travel information processing system 10. Each traveler profile 50 may contain information that can be used to process the travel related expenses of the corresponding traveler. Thus, a traveler profile 50 may contain the name or identity of a particular traveler, the name or identity of the customer 12 associated with the traveler, and the number of any debit or expense card issued to the traveler. Traveler profile 50 may also contain information that is used to determine a traveler's preferred travel arrangements, such as the air carriers, automobile rental agencies, or hotels preferred by the traveler, frequent flyer or renter programs in which the traveler participates, and the traveler's seating preference. In addition, each traveler profile 50 may contain information relating to a class or category for the traveler as established by the associated customer.

For example, different travelers associated with the same customer may have different spending limits and funds available to them when traveling. If the traveler is a new recruit of a particular business entity customer, the new recruit may be limited to a specified per diem allowance that is accessible only on a day-to-day basis. A marketing representative for the same customer may have a higher per diem allowance wherein the total amount for the trip is accessible in a lump sum prior to or on the first day of travel. Furthermore, an executive of the business entity customer may have an unlimited amount of funds available when traveling, such funds being accessible at any time.

A separate customer profile 52 may be maintained for each customer 12 in communication with travel information processing system 10. Each customer 12 ultimately pays the travel expenses of one or more of the travelers identified in traveler profiles 50. Thus, each customer profile 52 contains information that can be used to process the travel-related expenses of every traveler associated with a particular customer 12. This information may include the name or identity of a customer 12, the names or identities of every traveler associated with the customer 12, and the different categories or classes of travelers established by the customer 12. Furthermore, a customer profile 52 may include information that can be used to access the monetary accounts of a customer 12 at a financial institution 16, such as an EFT account number for the customer. Each customer profile 52 may also contain information used in filing a customer's tax forms with IRS system 28, such as the customer's tax identification number and the characterization of the customer as either a for-profit or nonprofit entity.

A separate provider profile 54 may be maintained for each provider 22 that provides products or services to any traveler identified in traveler profile 50. Generally, each provider profile 54 contains information that can be used to process the expenses incurred with a particular provider 22. Such information may include the name or identity of the provider, the type of service or product such as airline flight, hotel accommodation, meal, or copies, provided by the provider 22, an EFT account number for the provider, or other suitable information that facilitates processing of travel expenses incurred with the provider. A provider profile 54 may also contain information that can be used to determine availability and rates and book reservations with a particular provider 22.

A separate traveler category rule set 56 may be maintained for each customer 12 communicating with travel information processing system 10. Each traveler category rule set 56 contains a set of rules applicable to the various categories of travelers established by a particular customer 12. For example, a customer 12 may have several categories of travelers such as new recruit, marketing representative, and executive, wherein each category is subject to different restrictions and allowances for travel. The corresponding traveler category rule set 56 may contain information specifying as follows: (1) a new recruit receives a $120.00 per diem allowance that is accessible only on a day-to-day basis and can only fly coach class, (2) a marketing representative receives a $250.00 per diem allowance wherein the total amount for the trip is accessible in a lump sum prior to or on the first day of travel, and (3) particular executives may receive unlimited allowance when traveling. Traveler category rule sets 56 maintain the different rules for each customer 12 so that these rules can be applied when a travel itinerary is received from a particular customer.

A separate itinerary expense structure 58 may be maintained for each distinct travel itinerary, such as the itinerary for a single business trip. Each itinerary expense structure 58 may contain information relating to the cost of travel arrangements booked pursuant to the associated travel itinerary. These travel arrangements can be airline flights, hotel accommodations, or rental car. In addition, each itinerary expense structure 58 may contain information regarding the predicted amount of travel expenses for the travel itinerary, such as the per diem allowance allocated to a traveler for each day of travel.

A separate incurred expense structure 60 may also be maintained for each distinct travel itinerary. Each incurred expense structure 60, corresponding to a particular itinerary expense structure 58, contains information relating to the actual expenses incurred during travel pursuant to the itinerary. For example, incurred expense structure information may include the actual cost of a meal at a particular restaurant, the actual cost of hotel accommodations for a particular night, or the actual amount of money withdrawn for a per diem allowance on a given date during travel. Although many of the actual expenses may correspond to specific predicted expenses described above, some of the actual expenses may be unpredicted expenses, such as fare for an unplanned cab ride. According to one embodiment, the incurred expense information is collected and stored in incurred expense structure 60 as the expenses are incurred.

I/O device 41, which is linked to controller 36, functions to provide communication between travel information processing system 10 and a user, such as an employee of the information processing entity which maintains and operates the system. I/O device 41 may be implemented as a workstation or desktop computer having a keyboard, mouse, video display, or any other suitable device providing communication between the user and travel information processing system 10.

EDI interface 42 is electronically connected to controller 36. EDI interface 42 functions to link travel information processing system 10 to any of a number of entities with which electronic communication is desirable, such as customers 12, financial institutions 16, providers 22, and IRS system 28. For example, EDI interface 42 allows travel information processing system 10 to obtain from a provider 22 information that may be used to generate an electronic image of a receipt for services or products purchased from the provider. EDI interface 42 may be implemented with suitable hardware or software components.

Interactive voice response (IVR) system 43, which is also linked to controller 36, provides communication between a traveler and travel information processing system 10, for example, via a telephone network (not shown). IVR system 43 may function to receive travel expense information from a traveler by prompting the traveler to answer various questions presented in the form of a voice recording. In one embodiment, IVR system 43 may accept vocal responses from the traveler. Accordingly, IVR system 43 may include voice recognition hardware or software. In another embodiment, IVR system 43 accepts dual tone multifrequency (DTMF) responses from the traveler.

Bar code reader 44 is connected to controller 36. Bar code reader 44 functions to interpret or "read" bar code information. As described below, different bar codes may be associated with the travel related expenses of particular travelers or travel itineraries. It should be understood that bar code reader 44 is exemplary only. The present invention contemplates that in other embodiments any other technology which allows related information to be readily associated can be used instead of, or in addition to, bar code reader 44.

Report generator 45 is electronically linked to controller 36. Report generator 45 can function to generate reports detailing the expenses predicted for or actually incurred by various travelers. Report generator 45 may also function to report predicted expenses against actual expenses for a particular travel itinerary. Report generator 45 may organize the expense reports in various formats, including by customer, by traveler, or by travel itinerary.

Scanner imager 46 is also connected to controller 36. Scanner imager 46 functions to generate electronic images of paper documents, such as expense receipts, by "scanning" the documents. These electronic images can be used by travel information processing system 10 for expense reports. Scanner imager 46 may be implemented as any of a variety of currently available image scanners.

Image storage device 48, which is linked to scanner imager 46, functions to store the generated electronic images.

FIG. 3 illustrates a flow chart of a method 100 by which travel information processing system 10 processes travel-related expenses. Method 100 may be implemented as one or more software programs or routines on travel information processing system 10.

The method begins at step 102 where travel information processing system 10 generates and stores at least one each of a traveler profile 50, a customer profile 52, and a traveler category rule set 56. As stated above, traveler profile information may include the name of a traveler, the identity of a customer 12 associated with the traveler, a debit card number for the traveler and frequent flyer information. The customer profile information may include the identities of all travelers associated with a particular customer 12, an EFT account number for the customer, and the customer's tax identification number. Category rule set information includes a set of guidelines or rules applicable to the various categories of travelers established by a particular customer 12. For example, a category rule set may specify a per diem allowance for each category of traveler, an entertainment allowance for each category, and fare class restrictions, such as coach class, business class, or first class. In one embodiment, travel information processing system 10 may prompt a user, via I/O device 41, to input specific information for each traveler, customer, and travel service provider with whom travel information processing system 10 interacts. The generated profiles and rule sets are stored in database 40.

At step 104, travel information processing system 10 receives travel itinerary information from a customer 12, via communications subsystem 14. The travel itinerary information may include the identity of a traveler associated with the customer, the tentative times and dates of travel, and the type of travel arrangements, services, and products needed. For example, the travel itinerary information may specify that J. Smith needs a flight from Los Angeles to New York on April 25th, hotel accommodations in New York for the nights of April 25th through April 28th, and a return flight from New York to Los Angeles on April 29th. If the customer 12 or traveler is new to travel information processing system 10, system 10 may prompt a user to input traveler profile information, customer profile information, category rule set information, or any other information that is required to process travel expenses for the traveler.

Based upon on the identity of the traveler specified in the itinerary information, travel information processing system 10 retrieves an appropriate traveler profile 50, such as, for example, the traveler profile for J. Smith, from database 40 at step 108. Furthermore, because database 40 can be a relational database, travel information processing system 10 is also able to retrieve a corresponding customer profile 52 and category rule set 56. For example, a pointer or index in the traveler profile for J. Smith may point to the customer profile and category rule set for ABC Corporation.

At step 110, using the retrieved traveler profile 50, customer profile 52, and category rule set 56, travel information processing system 10 determines the amount of funds to be allocated to the traveler identified by the travel itinerary information. For example, traveler profile 50 may indicate that J. Smith is a marketing representative for ABC Corporation. Category rule set 56 may specify that marketing executives are to receive a $150.00 per day allowance for meals (e.g., breakfast, lunch, and dinner) and gasoline for a rental car. Furthermore, category rule set 56 may specify that marketing representatives can spend up to $100.00 per day for entertainment expenses. Consequently, for J. Smith's four-night stay in New York, travel information processing system 10 may determine that J. Smith is to be allocated $1000.00 (4 days×($150.00 per day meal allowance +$100.00 per day entertainment expense)). This information relating to the allocated funds corresponds to the predicted expenses of the traveler and thus can be further broken out by each separate expense, such as, for example, $10.00 for breakfast, $20.00 for lunch, $40.00 for dinner, and $15.00 for gasoline. The predicted travel expense information can be stored in an appropriate itinerary expense structure 60 in database 40.

Also using the information from traveler profile 50, customer profile 52, and traveler category rule set 56, travel information processing system 10 determines suitable travel arrangements for the traveler. For example, if traveler category rule set 56 indicates that marketing representatives cannot fly in first class, J. Smith will be afforded business or coach class seating for the flights on April 25th and April 29th. At step 112, travel information processing system 10 accesses an appropriate provider 22 through a computer reservation system 26 or other suitable media to book the arrangements. Continuing with the example of J. Smith, travel information processing system 10 may access American Airlines through the SABRE computer reservation system to book the airline seats. Provider 22 may send electronic receipt information for the booked travel arrangements to travel information processing system 10 via EDI interface 24. This receipt information can be stored in an incurred expense data structure 60 in database 40. In an embodiment, incurred expense structure 60 is a storage media which does not allow its contents to be altered or re-written.

The cost of all travel arrangements booked pursuant to the received travel itinerary information is determined at step 114 by summing up the price charged for each type of travel arrangement. For example, if travel arrangements booked for J. Smith include a round-trip airline flight with a cost of $525.00, a four night stay at a hotel with a cost of $680.00, a rental automobile for four days with a cost of $185.00, then the cost of travel arrangements is $525.00+$680.00+ $185.00=$1390.00.

At step 116, travel information processing system 10, via electronic communications subsystem 18, accesses the customer's account in an appropriate financial institution 16 using the EFT account information retrieved from customer profile 52. For example, if ABC Corporation maintains an account at XYZ Bank, travel information processing system 10 uses ABC Corporation's EFT account number to access the XYZ Bank account.

Travel information processing system 10 electronically transfers funds from the customer's account at step 118. These funds may be transferred into another account in the same financial institution 16, an account in a different financial institution 16, or any one or more other financial accounts distinct from the customer's account. These other accounts may be associated with providers 22 or the information processing entity that maintains and operates travel information processing system 10. The amount of funds transferred can be equal to the sum of the amount of funds allocated for expenses and the cost of all travel arrangements booked pursuant to the travel itinerary information. Consequently, in the example of J. Smith, $2390.00 ($1000.00 for allocated travel expenses +$1390.00 for booked travel arrangements) may be debited from the account of ABC Corporation. In one embodiment, the entire debited amount can be credited to an account maintained by the entity which operates travel information processing system 10. Funds from this entity's account can be transferred when payment becomes due for each travel expense. In another embodiment, a portion of the funds debited from a customer's account is immediately credited to accounts maintained by one or more providers 22. For example, with regard to the booked travel arrangements, $525.00 of the debited amount may be credited to an account maintained by American Airlines to pay for the cost of the airline ticket, $680.00 may be credited to an account maintained by a hotel to pay for the cost of the hotel accommodations, and $185.00 may be credited to an account maintained by a rental car agency to pay for the cost of automobile rental. When funds are directly credited into the accounts of providers 22, the providers 22 are not required to pay service charges to a credit card company such as the case if a credit card is used to pay for the travel arrangements. The remaining $1000 may be credited to the account maintained by the entity operating travel information processing system 10.

At step 120, a portion of the transferred funds is made available to the traveler. For example, the $1000 credited to the account of the information processing entity is made available to J. Smith. In one embodiment, the traveler is assigned a debit card which can be used at an ATM network 20 to retrieve cash in amount of the available funds. The traveler may then use the retrieved cash to pay for travel expenses. The present invention contemplates that the debit card assigned to a traveler can also be used with providers 22, such as restaurants, gas stations, copy stores, and the like, in order to pay directly for services or products. Each of these providers 22 can be equipped with an EDI interface 24 that allows travel information processing system 10 to receive an electronic receipt of the traveler's transactions with that provider 22.

It should be noted that the amount and time when funds are made available to a particular traveler may depend on the category of the traveler and the applicable rules. For example, the rules in category rule set 56 may stipulate that if the traveler is a new recruit, the amount of funds corresponding to a per diem allowance are available only on the specific date of the allowance. On the other hand, if the traveler is a marketing executive, the full amount of funds allocated for a particular travel itinerary may be available at the beginning of or prior to the trip.

At step 122, travel information processing system 10 maintains a record of each of the traveler's transactions, which may include both cash withdrawals from ATM network 20 and transactions with a provider 22. Each time that a traveler uses the assigned debit card, information specifying the amount of funds and the debit card account number may be sent to travel information processing system 10 through a suitable medium, such as electronic communications subsystem 18 or EDI interface 24. Consequently, because a record of the debit card account number assigned to a specific traveler may be maintained in the traveler's associated traveler profile 50, travel information processing system 10 is able to track all transactions in which the traveler uses the debit card. This transaction information is stored in an appropriate incurred expense structure 60 in database 40.

Travel information processing system 10 may also receive information specifying how the funds allocated to a traveler are actually spent. For transactions in which the debit card is used directly with providers 22, receipt information indicating the type of service or product provided can be sent via an appropriate EDI interface 24 to system 10. For example, if J. Smith spends $45.00 for dinner at a Restaurant A connected by an EDI interface 24 to travel information processing system 10, then system 10 receives receipt information from Restaurant A when J. Smith uses her debit card to pay for the dinner. For expenses paid for in cash acquired using cash withdrawals at ATM network 20, receipt information can be input by the traveler via IVR system 43. More specifically, IVR system 43 allows a traveler, such as J. Smith, to input the receipt information over a telephone network or other medium with voice-carrying or DTMF capacity. In an alternate method for tracking receipts when funds are withdrawn from an ATM network 20, a traveler may be issued one or more bar-coded sheets of paper to which the traveler attaches receipts for her actual expenses. The bar-coded sheets with attached receipts are facsimile transmitted to travel information processing system 10. An image of the receipt information is input into the system using scanner imager 46, and then stored in image storage device 48. The bar code on each sheet may identify the traveler or itinerary so that the receipt information on a particular sheet can be associated with the appropriate traveler or itinerary.

At step 124, travel information processing system 10 reports the record of actual expenses for an itinerary against the predicted expenses for the itinerary and then generates an expense report. The expense report may be organized in various formats, including by customer, by traveler, or by travel itinerary. Generally, the generated report may include information specifying the time and dates of travel, the type and cost of all travel arrangements used by the traveler, the times and dates for all transactions, the services or products purchased, the predicted expenses for the traveler, the actual expenses for the traveler, and the difference between the predicted expenses and the corresponding actual expenses. For example, an expense report generated for J. Smith may include information about the American Airlines flight, the 4-day hotel accommodations, the rental car, the $1000.00 in funds allocated to Smith for travel expenses, each cash withdrawal made by Smith, and each transaction relating to products or services actually purchased by Smith. The generated report may also include electronic images or copies of the receipts for each actual purchase of a service or product. This step is described below in more detail with reference to FIG. 4.

At step 126, the report is sent to the customer 12 associated with the traveler for review. Accordingly, the report for J. Smith's travel expenses is sent to ABC Corporation. Customer 12 may use the generated reports for tax purposes.

FIG. 4 illustrates a flow chart of a method 200 by which travel information processing system 10 reports actual travel expenses against predicted travel expenses and generates an expense report. Method 200 may be implemented as a subroutine of method 100 described above with reference to FIG. 3.

Method 200 begins at step 202 where information is retrieved from an itinerary expense structure 58 and an incurred expense structure 60. The retrieved information relates to the same travel itinerary. The information retrieved from itinerary expense structure 58 may specify one or more predicted expenses or transactions of a traveler for the itinerary. Each transaction may be broken out by the type of product or service, predicted cost, and date of transaction. For example, the retrieved itinerary expense structure 58 may specify that on April 26th, the traveler will spend $10.00 for breakfast, $20.00 for lunch, $40.00 for dinner, and $15.00 for gasoline. These transactions may have been previously determined by travel information processing system 10. Incurred expense structure information may specify all actual transactions of the traveler pursuant to the travel itinerary. At least some of the actual transactions may correspond to some of the predicted transactions. The actual transactions may also be broken out by type, cost, and date. Thus, for example, the retrieved incurred expense structure 60 may specify that on April 26th, the traveler spent actual amounts of $8.75 for breakfast, $17.00 for lunch, $46.00 for dinner, and $45.00 for gasoline.

A predicted transaction is selected at step 204. At step 206, travel information processing system 10 queries whether an actual transaction corresponding to the predicted transaction is equal to the predicted transaction. In other words, it is determined whether the predicted cost is equal to actual cost for a specific service or product. If not, travel information processing system 10 determines the difference in cost at step 208. For example, with regard to the purchase of a gasoline on April 26th, the actual cost of $45.00 is more than the predicted cost of $15.00. Thus, travel information processing system 10 calculates the $30.00 difference.

At step 210, travel information processing system 10 determines whether the current predicted transaction is the last transaction for the travel itinerary. If not, travel information processing system 10 returns to step 204 where the next predicted transaction is selected. Travel information processing system 10 repeats steps 204–210 until the difference between each predicted transaction and corresponding actual transaction are determined and stored in database 40.

At step 212, travel information processing system 10 then determines whether there are any unpredicted actual transactions. If there are no unpredicted travel expenses, an expense report for the travel itinerary is generated by report generator 44 at step 222. The transaction report may specify the predicted transactions and the actual transactions.

If there are unpredicted actual transactions, such as an unexpected cab ride that costs $12.00, travel information processing system 10 selects the unpredicted transaction at step 214. At step 216, the system determines whether the unpredicted actual transaction is within an acceptable range. For example, the customer associated with the traveler may specify in advance that cab fare for particular cab rides should not exceed $50.00. If the unpredicted transaction is outside the acceptable range, travel information processing system 10 determines the difference at step 218.

At step 220, travel information processing system 10 determines whether the current unpredicted transaction is the last of the unpredicted transactions for the travel itinerary. If not, the system returns to step 214 where the next unpredicted transaction is selected.

Travel information processing system 10 repeats steps 214–220 until all unpredicted actual transactions have been analyzed.

At step 222, report generator 45 generates an expense report. As described above, report generator 45 may organize the expense reports in various formats, including by customer, by traveler, or by travel itinerary. The expense report may detail the predicted transactions, the actual transactions, the unpredicted actual transactions, and the amount by which each unpredicted actual transaction exceeds an appropriate guideline.

Although the present invention has been described with several embodiments, a myriad of changes, variations, alterations, transformations, and modifications, may be suggested, and it is intended that the present invention encompass such changes, variations, alterations, transformations, and modifications as fall within the spirit and scope of the pending claims.

What is claimed is:

1. A method for facilitating the processing of travel related expenses, comprising the steps of:
   receiving travel itinerary information for a traveler associated with a customer;
   retrieving information from a traveler profile, a customer profile, and a category rule set from a database;
   determining a specified amount of funds to be allocated to the traveler;
   transferring the specified amount of funds from an account of the customer;
   providing at least a portion of the transferred funds to the traveler; and
   receiving a record of any transactions in which the traveler spends the portion of transferred funds, thereby facilitating the processing of travel related expenses.

2. The method of claim 1, further comprising the step of booking travel arrangements.

3. The method of claim 2, wherein the step of transferring the specified amount of funds further comprises the step of debiting the customer's account according to the cost of the travel arrangements.

4. The method of claim 1, further comprising the step of generating traveler information, customer information, and category rule set information.

5. The method of claim 1, wherein the step of providing at least a portion of the transferred funds further comprises the step of providing through an automated teller machine.

6. The method of claim 1, further comprising the step of identifying a category for the traveler.

7. The method of claim 1, wherein the step of receiving travel itinerary information further comprises the step of receiving information regarding any travel arrangements required by the traveler.

8. The method of claim 1, further comprising the step of storing the received record of transactions in a database.

9. The method of claim 1, further comprising the step of determining at least one predicted expense of the traveler.

10. The method of claim 9, further comprising the step of reporting an actual expense of the traveler against the predicted expense.

11. A method for facilitating the processing of travel related expenses, comprising the steps of:
    determining at least one predicted expense of a traveler associated with a customer;
    electronically receiving receipt information from a provider, the receipt information relating to at least one actual expense of the traveler;
    electronically transmitting the receipt information to the customer, thereby facilitating the processing of travel related expenses; and
    reporting to the customer the actual expense of the traveler against the predicted expense.

12. The method of claim 11, further comprising the step of receiving travel itinerary information for the traveler.

13. A system for facilitating the processing of travel related expenses, comprising:
    a database operable to store traveler profile information, customer profile information, and traveler category rule set information; and
    a controller connected to the database and operable to:
      receive travel itinerary information for a traveler associated with a customer;
      determine a specified amount of funds to be allocated to the traveler;
      transfer the specified amount of funds from an account of the customer;
      provide at least a portion of the transferred funds to the traveler; and
      receive a record of any transactions in which the traveler spends the portion of transferred funds, thereby facilitating the processing of travel related expenses.

14. The system of claim 13, further comprising an electronic data interchange interface operable to transmit and receive electronic information.

15. The system of claim 13, further comprising a database management system connected to the database and the controller, the database management system operable to manage the information stored in the database.

16. The system of claim 13, further comprising an interactive voice response system operable to provide communications between the traveler and the system.

17. The system of claim 13, wherein the controller is further operable to book travel arrangements according to the received travel itinerary information.

* * * * *